April 14, 1931.   J. C. MacPHAIL   1,800,272
FENDER GUARD
Filed June 3, 1929
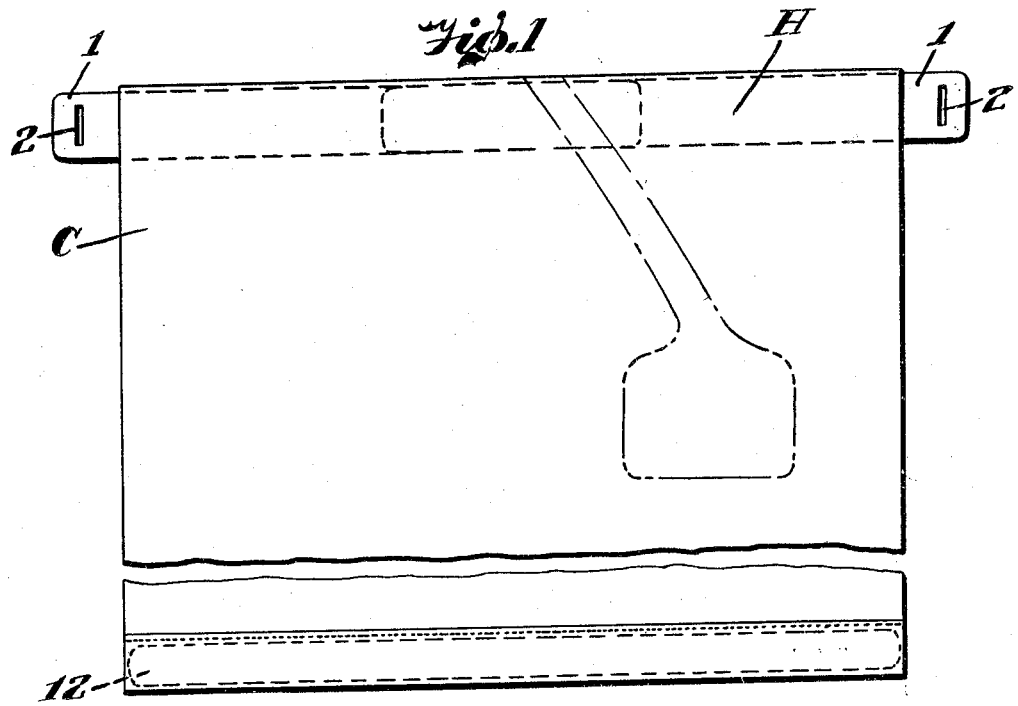
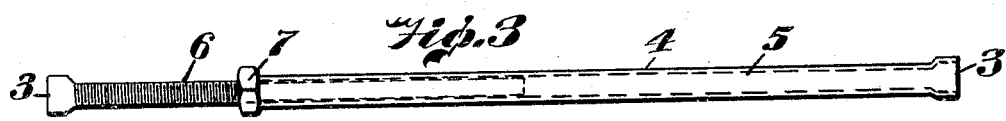
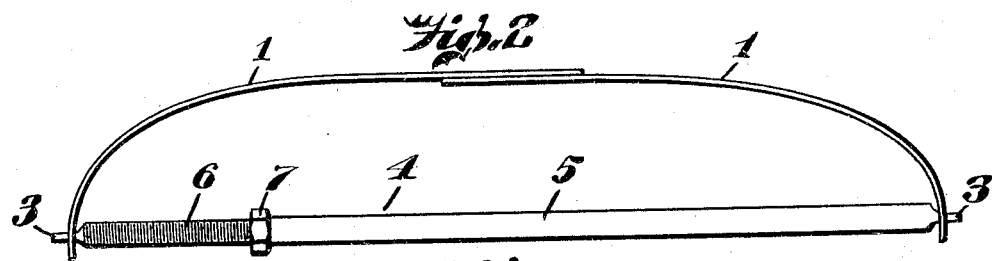
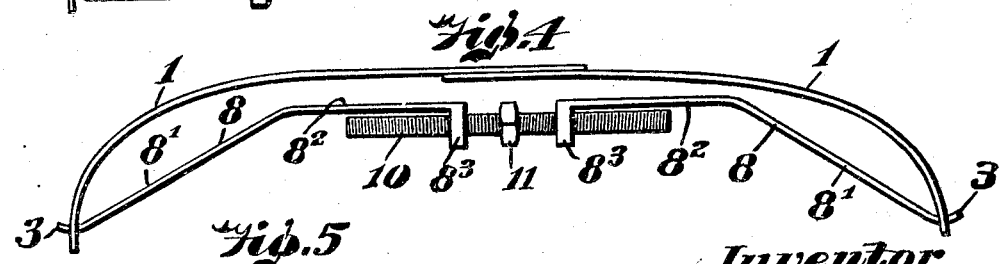
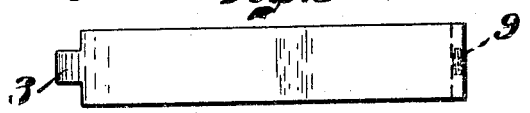
Inventor
James C. MacPhail
By Ellis Spear Jr.
Attorney Patented Apr. 14, 1931

1,800,272

UNITED STATES PATENT OFFICE

JAMES C. MacPHAIL, OF SOUTH PORTLAND, MAINE, ASSIGNOR TO MAX ZAIGER, OF SWAMPSCOTT, MASSACHUSETTS, AND LOUIS ZAIGER, OF LYNN, MASSACHUSETTS

FENDER GUARD

Application filed June 3, 1929. Serial No. 367,869.

This invention relates to splash guards or protectors for automobile fenders. As is well known, tar and gravel or other road materials, as well as mud, are thrown by the rapidly moving wheels back against the fender, and adjacent chassis and body parts to which the same are inclined to stick, not only accumulating on the inside of the fender, and adjacent parts, which is objectionable in itself, but gradually tending to rust or otherwise attack the material of the fender and parts.

It is the object of my invention to produce a device which not only will protect the car from such accumulations, but which is a unit, in and of itself complete and applicable to the fender without any necessity for bolts, nuts or screws, such as have heretofore been used to attach a guard to a fender.

Former structures have always, so far as I am aware, required that the fender be drilled in order that the guard might securely be held in position thereon, or the guard was clamped by gripping members which necessarily to a greater or less extent defaced the smooth exterior surface thereof and marred the appearance of the car.

My invention is also capable of use with fenders of different sizes, including within its own structure means for adjustment to correspond with the dimensions of the fender with which the same is to be used.

In the accompanying drawings I have illustrated two forms of my invention which have been found highly satisfactory in use.

Throughout the specification and drawings like reference numerals are employed to indicate corresponding parts.

In the drawings:

Fig. 1 is an elevation of my invention with the protector in place on the frame.

Fig. 2 is a plan view of the frame, the protector being removed.

Fig. 3 is a section of the spring adjustment and fender engaging means.

Fig. 4 a corresponding view of a modified construction, and

Fig. 5 a view of one of the spring arms of this modified form.

My fender guard comprises a flexible protector C of suitable material such as waterproofed fabric, artificial leather or the like, and which is adapted to be disposed of at the rear of the fender on the inside thereof to intercept the tar or mud which is thrown backward and upward by the rotating wheel of the automobile.

The rapidly moving wheels tend to create a rear suction so that these objectionable materials are drawn upward and cause the same to adhere to the outside or back top of the fender and also the rear body and chassis. My protector is intended to intercept the dirt carried by this back draft.

In Fig. 1, I have shown in dot and dash lines a cut-out portion through which the springs of certain cars may project. This is not necessary in the case of the majority of cars however.

The protector C is provided with a hem H which is adapted to receive the spring arms 1, these arms not only serving to carry the protector but also to assert a strong pressure to hold it closely against the inner side of the fender.

The bottom of the curtain has also a hem containing a weighted and stiffening piece tending to hold the curtain in vertical or suspended position.

The spring arms 1 comprise two similar flat pieces of spring metal, each slotted near one end, as at 2, to receive the flat ends 3 of the adjustable expansion bar and fender engaging means 4 as shown in Fig. 2. The arms 1 when in place within the fender normally overlie each other to a greater or less extent, allowing the same to be accommodated within the fender according to the adjustment of the expansion bar 4.

My adjustable expansion bar 4 comprises a metal tube 5 adapted to telescopically receive one end of a threaded member 6 which is screwed into or out of the tube 5, the nut 7 being turned to take up the adjustment. The rod 5 and the member 6 are each provided at their outer ends with flat portions 3 adapted to be inserted through the apertures 2 of the spring arms 1, those portions thereof which extend beyond the spring arms being adapted to contact the side flanges or beads of the inside of the fender in subtending relation to the strips to hold the same in flecked conformity to the fender interior.

As the means 4 are adjusted to adapt the same to the width of the fender and engage the ends 3 tightly therewith, a resultant pressure is applied to the spring arms 1 forcing the same with the protector C tightly against the inner surface of the entire width of the fender, thus further tending to overcome any likelihood of the protector slipping or becoming dislodged when once in place on the fender.

The forms shown in Figs. 4 and 5 are used in the same manner as the preferred form of Figs. 1 to 3 inclusive, the only difference lying in the adjusting means employed. This form is intended for cars the fenders of which are set close to the tire periphery or where loose chains are used which might strike the adjusting bar. In this form, instead of the members 5 and 6, I use a pair of members 8 formed near their outer ends to enter the slots 3 of the arms 1, then bent rearwardly, as at 8', then horizontally as at $8^2$, and finally at right angles as at $8^3$. The portions $8^3$ are tapped as at 9 to receive a reversely threaded piece 10 turned by a wrench hold 11 which as it rotates the piece 10 tends to force the members 8 either from each other correspondingly increasing the pressure of the arms 1 against the fender, or drawn the same toward each other, thus disengaging the ends 3 from the fender and at the same time reducing the wall engaging pressure of the spring arms 1.

Various modifications in the construction and operation of my device obviously may be resorted to without departing from the spirit of my invention if within the limits of the appended claims.

What I therefore claim and desire to secure by Letters Patent is:

1. In a fender guard, a splash intercepting curtain, a flexible suspending member therefor from which the curtain is suspended, and fender engaging means associated with said suspending means and extending from one edge of the fender to the other, said fender engaging means comprising a pair of threaded members adjustably interengaged to expand the suspending member within the fender and hold said curtain within and in flexed conformity to said fender.

2. In a fender guard, a splash intercepting curtain having a transverse pocket at its upper edge, a flexible suspending member therein, fender engaging means associated with said suspending means and situated exterior to said pocket, said fender engaging means comprising a pair of threaded members adjustably interengaged to expand the suspending member within the fender and hold said curtain within and in close conformity to said fender.

3. In a fender guard, a splash intercepting curtain, a pair of flexible strips engaged with said curtain and projecting transversely thereof, an expansion member engaging said strips and fender in subtending relation to the strips held thereby in flexed conformity to the fender interior.

4. In a fender guard, a splash intercepting curtain, having a transverse top pocket, a pair of flexible strips therein projecting beyond the pocket ends, an expansion member engaging said strips and adapted to engage opposite inner sides of the fender edge in subtending relation to the strips held thereby in flexed conformity to the fender interior.

5. In a fender guard, a splash intercepting curtain of flexible material having a transverse top pocket, a pair of flexible strips overlapped therein and projecting beyond the pocket ends, said exposed strip ends being apertured, an expansion member having its ends engaged in said apertures and adapted to engage opposite inner sides of the fender edge in subtending relation to the strips held thereby in flexed conformity to the fender interior.

In testimony whereof I affix my signature.

JAMES C. MacPHAIL.